US009441858B2

(12) United States Patent
Ba-abbad et al.

(10) Patent No.: US 9,441,858 B2
(45) Date of Patent: Sep. 13, 2016

(54) SOLAR HEATING APPARATUS AND METHODS

(75) Inventors: Mazen Ba-abbad, Riyadh (SA); Hany Al-Ansary, Riyadh (SA); Essam Al-Ammar, Riyadh (SA)

(73) Assignee: King Saud University, Riyadh (SA)

( * ) Notice: Subject to any disclaimer, the term of this patent is extended or adjusted under 35 U.S.C. 154(b) by 940 days.

(21) Appl. No.: 13/088,301

(22) Filed: Apr. 15, 2011

(65) Prior Publication Data

US 2012/0260907 A1    Oct. 18, 2012

(51) Int. Cl.
*F24J 2/38* (2014.01)
*F24J 2/10* (2006.01)
*F24J 2/24* (2006.01)
*F24J 2/54* (2006.01)

(52) U.S. Cl.
CPC .............. *F24J 2/1047* (2013.01); *F24J 2/248* (2013.01); *F24J 2/5417* (2013.01); *F24J 2002/108* (2013.01); *F24J 2002/1019* (2013.01); *Y02E 10/44* (2013.01); *Y02E 10/47* (2013.01)

(58) Field of Classification Search
CPC ..................................................... Y02E 10/47
USPC ........................................ 126/607, 714, 606
See application file for complete search history.

(56) References Cited

U.S. PATENT DOCUMENTS

| | | | | |
|---|---|---|---|---|
| 3,924,604 A * | 12/1975 | Anderson | ................ | F16C 32/00 126/605 |
| 4,063,543 A * | 12/1977 | Hedger | ...................... | F24J 2/16 126/579 |
| 4,102,326 A * | 7/1978 | Sommer | .................... | F24J 2/10 126/575 |
| 4,110,009 A * | 8/1978 | Bunch | ....................... | F24J 2/16 126/600 |
| 4,148,301 A * | 4/1979 | Cluff | ...................... | F24J 2/1047 126/568 |
| 4,159,710 A * | 7/1979 | Prast | ......................... | F24J 2/07 126/579 |
| 4,169,712 A * | 10/1979 | Boyce | .................... | C12M 21/04 126/561 |
| 4,203,426 A * | 5/1980 | Matlock | ..................... | F24J 2/14 126/578 |
| 4,218,114 A * | 8/1980 | Bunch | ........................ | F24J 2/16 126/688 |
| 4,276,872 A * | 7/1981 | Blake | ........................ | F24J 2/16 126/578 |
| 4,286,581 A * | 9/1981 | Atkinson, Jr. | ............. | F24J 2/06 126/585 |
| 4,730,602 A * | 3/1988 | Posnansky | ................. | F24J 2/10 126/605 |
| 6,959,993 B2 * | 11/2005 | Gross | ......................... | F24J 2/07 126/684 |
| 8,033,110 B2 * | 10/2011 | Gilon | ...................... | F03G 6/001 60/641.11 |
| 2005/0229924 A1 * | 10/2005 | Luconi | ...................... | F24J 2/16 126/696 |
| 2010/0071683 A1 * | 3/2010 | Selig | ...................... | F24J 2/1047 126/605 |
| 2011/0108018 A1 * | 5/2011 | Heinsohn | .............. | F24D 11/003 126/585 |
| 2011/0284362 A1 * | 11/2011 | Ba-abbad | ............. | B01D 1/0035 203/10 |
| 2011/0315542 A1 * | 12/2011 | Ba-Abbad | ............. | B01J 19/127 204/157.6 |
| 2014/0053825 A1 * | 2/2014 | Zhou | ........................ | F24J 2/541 126/606 |

* cited by examiner

*Primary Examiner* — Avinash Savani
*Assistant Examiner* — George R Blum
(74) *Attorney, Agent, or Firm* — Hauptman Ham, LLP

(57) ABSTRACT

Solar heating systems and methods are described. In one aspect, a system is described that includes multiple mirror row holders, with each row holder configured to hold a row of mirrors at angles to track sunrays and reflect the rays onto a focal point. Each row holder has a single pinion device of multiple pinion devices associated with the multiple row holders. The system also has a sun tracking latitudinal slider (STLS) rack configured to interface with each pinion device on a respective mirror row holder. This interface tilts the mirrors in each row holder an amount to adjust mirror angles to reflect latitudinal sun motion to concentrate rays of the sun onto the focal point. The system also includes an azimuth adjustment mechanism to control mirror angles with respect to the sun to reflect sun motion during daylight.

10 Claims, 12 Drawing Sheets

SOLAR HEATING APPARATUS AND METHODS

BACKGROUND

Solar thermal collectors capture and retain heat from the sun and transfer this heat to a liquid. A simple approach to solar heating of water is to simply mount a metal tank filled with water in a sunny place. The heat from the sun would then heat the metal tank and the water inside.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Solar heating systems and methods are described. In one aspect, a system is described that includes multiple mirror row holders, with each row holder configured to hold a row of mirrors at angles to track sunrays and reflect the rays onto a focal point. Each row holder has a single pinion device of multiple pinion devices associated with the multiple row holders. The system also has a sun tracking latitudinal slider (STLS) rack configured to interface with each pinion device on a respective mirror row holder. This interface tilts the mirrors in each row holder an amount to adjust mirror angles to reflect latitudinal sun motion to concentrate rays of the sun onto the focal point. The system also includes an azimuth adjustment mechanism to control mirror angles with respect to the sun to reflect sun motion during daylight.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Systems and methods for solar heater systems and methods are described. These systems and methods include Fresnel type mirrors that are collectively moved by two motors and a fixed arrangement of pipes that contain a heat exchanging fluid (e.g., mineral oil, molten salt, ionic liquid, water, air, etc.). The Fresnel mirrors are collectively moved to track the latitude motion of the sun by a sun tracking latitude-sliding rack. Each mirror row has a pinion gear that rotates tracking the latitude motion of the sun with the linear motion of the sliding rack. The azimuth motion of the sun is tracked by rotating the whole set around its central axis. The system can be covered with transparent box (e.g. glass, etc.) to keep the dust from sticking to moving parts and to make the system cleaning very simple. In this solar heating system and at the concentration of the Fresnel mirrors that focuses the solar rays on a central fixed target, is a heat exchanger that has heat-exchanging fluid going through (e.g. mineral oil, molten salt, ionic liquid, water, air, etc.). The system pumps cooler fluid from a container that contains the cold fluid into the heat exchanger portion for heating. This heating reaches its highest temperature at in a serpentine 104, and then, is collected at a hot fluids container to be used for power generation, water desalination, and/or so on. The system can be cascaded in rows, in which only one motor is used to track the sun's azimuth motion. One of the qualities of this system that it can heat with concentrated solar rays a fixed object from its bottom side, which makes this system very simple and economical to be used for solar electric power generation and solar water desalination.

Heat exchanger enabled solar heating systems and methods are now described in greater detail in view of the exemplary embodiments of FIGS. 1 through 14.

An Exemplary System

Figure 1:
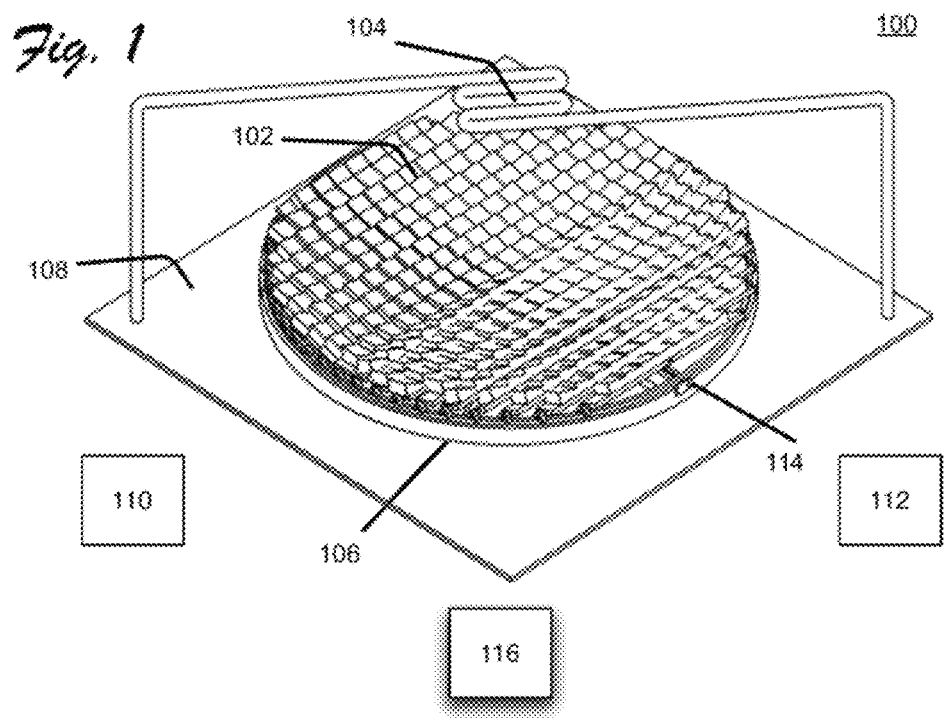
FIG. 1 is a structural diagram illustrating an exemplary heat exchanger enabled solar system, according to one embodiment.

FIG. 1 is a structural diagram illustrating an exemplary solar system 100, according to one embodiment. In this example, the solar heating system 100 includes an array of tracking mirrors 102 (e.g., a heliostat of Fresnel mirrors) operatively configured to focus solar radiation on a serpentine portion of a heat exchanger 104. To maintain the shape, function and integrity of the solar heating system 100, the system is operatively coupled to structural foundation 106, which in turn is attached to base 108. In this exemplary embodiment, base 108 is planar. In another embodiment, base 108 is not on a non-planar surface and configured to be planar on the top.

Referring to FIG. 1, system 100 is operatively coupled to one or more computer devices 116. The computing device(s) include a processor, operatively coupled to a memory comprising computer program instructions that when executed direct the system 100 to operate. Specifically, system 100 responds to program instructions received from computing device 116 to receive into heat exchanger 104 a cool input fluid such as a heat exchanging fluid (e.g. metallic oil, etc.) stored in an input heat exchange fluid storage/container 110. The computing device 116 causes system 100 to utilize a Sun Tracking Latitude-Sliding (STLS) rack 114 to collectively move the Fresnel mirrors in the mirror array 102. As discussed below, the STLS rack 114 traverses, row-by-row underneath each of the rows of mirrors 102, using its linear motion to automatically adjust each row of mirrors, via respective row holders (FIG. 2, e.g., item 200-1 through 200-N), to track the latitude position of the sun as it migrates across the sky. This angular migration concentrates solar rays from the mirrors 102 onto a focal point (e.g., a serpentine portion) of the heat exchanger 104. This focused concentration of the sun's rays cause the cooler fluid that was input into the heat exchanger 104 to heat to a very hot temperature. System 100 collects and stores the heated fluids exiting from the focal point of the serpentine portion of the heat exchanger 104 into hot fluids container 112. These solar heated fluids 112 are for subsequent use for power generation, water desalination, and/or so on.

Figure 2:
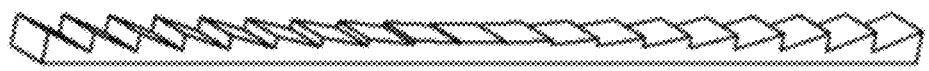
FIG. 2 shows an exemplary Fresnel faceted flat mirrors row holder, according to one embodiment.

FIG. 2 shows an exemplary Fresnel faceted flat mirrors row holder 200, according to one embodiment. Because a solar heating system 100 includes multiple rows N of mirrors, there are row holders 200-1 through 200-N. For purposes of reference, however, we discuss a row holder as row holder 200. Each row holder 200 is configured to hold some portion (a whole row or less that an entire row) of a row's mirrors 102. Because each row if offset some degree from the location of the sun and from the focal point location on the heat exchanger 104, the flat pad for installing each mirror onto the row holder 200 is typically tilted some degree(s) to ensure that the reflected sun's rays will be concentrated at the focal point of the heat exchanger. That is, each of the mirrors 102 in each row are preconfigured via a Fresnel faceted flat mirrors row holder 200 to have a particular angle (e.g., 0° to 45°) based on the architecture and positions of the solar heater and the location and position of the focal point of the heat exchanger 104.

Figure 3A:
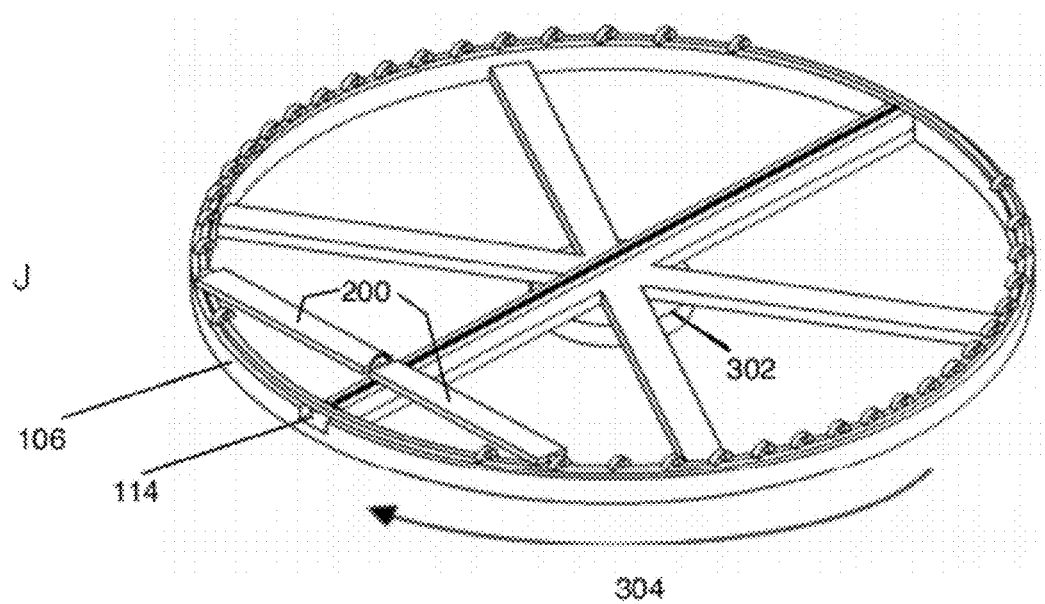
FIG. 3a shows further exemplary aspects of the structural foundation and the sun tracking latitude slider rack for the solar heater system, according to one embodiment.

FIG. 3a shows further exemplary aspects of structural foundation 106 of FIG. 1 for the solar heater system 100, according to one embodiment. As shown, this portion of system 100 includes Sun Tracking Azimuth Rotation (STAR) pivot 302 to adjust the solar heating system 100 to track the azimuth motion of the sun by rotating the whole system 100 around its central axis. This rotation is shown, for example, by the approximately ninety-degree (90°) change in location of STLS rack 114 as represented by motion arrow 304, and by the change in location of STLS rack 114 in FIG. 1 to FIG. 3a.

Figure 3B:
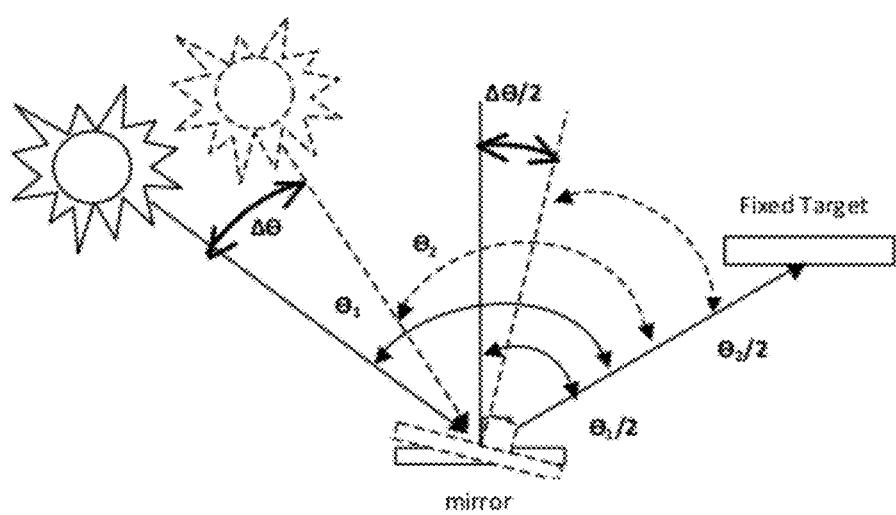
FIG. 3b shows exemplary sun latitude adjustment degree (s) to mirror degree-angling relationships, according to one embodiment.
Figure 3C:
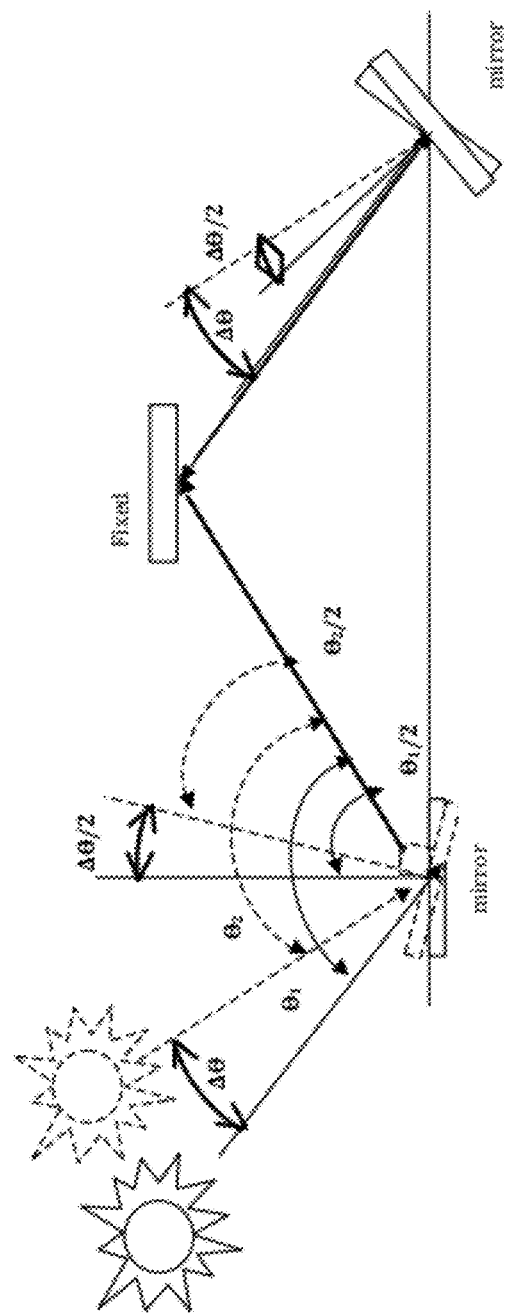
FIG. 3c shows additional exemplary sun latitude adjustment degree(s) to mirror degree-angling relationships, according to one embodiment.

FIG. 3a also illustrates further aspects of STSL rack 114 used to angle/tilt respective rows of mirrors 102 to meet a preconfigured optimal latitude angle based on the day, time of day, month, and year, to ensure that the sun's rays from each of the mirrors in the row are focused on the serpentine focal point of the heat exchanger 104. As shown, a single rack 114 is placed on the diameter of the circle 106, perpendicular to the rows of mirrors 102. Each of the mirrors 102 in a row are preconfigured for layout onto a single (or more) mirrors row holder 200 (originally shown in FIG. 2 and represented again in FIG. 3) to have a particular angle based on the diameter configuration of the solar heater and the position of the focal point of the heat exchanger 104. By using small sized mirrors 102 and with the required angular displacement to track the sun's elevation angle between 20 and 90 degrees being around 35 degrees, the protrusion of the sliding rack 114 from the circle 106 is rather small. FIGS. 3b and 3c show such exemplary sun latitude adjustment degree to mirror degree-angling relationships, according to respective embodiments. Configuring and placing a corresponding row holder 200 to hold and position the mirrors in each row achieves an angular row-to-row displacement basis. The sliding rack 114 is made from rigid material that does not substantially elongate under load.

Figure 4:
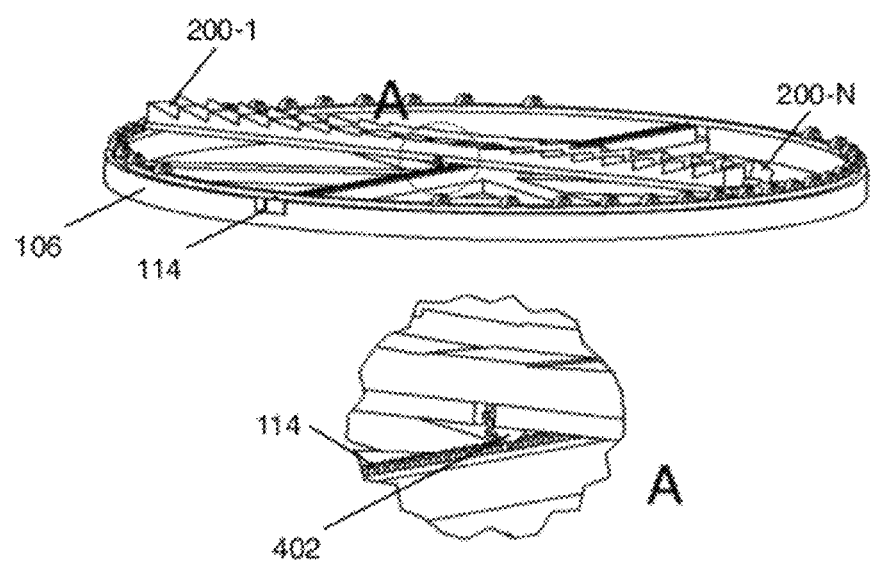
FIG. 4 shows pivot-gearing aspects of the mirrors row holder for the solar heater system, according to one embodiment.

FIG. 4 illustrates further exemplary aspects of sun tracking latitude-sliding rack 114 in communication with a priority gearing 402 in a respective row of mirrors 200 (e.g., one of 200-1, 200-2, etc. (e.g., 200- . . . , 200-N)), according to one embodiment. The sliding rack 114 moves in translation motion (front to back and back to front) to interface with and to allow the gears of pinion 402 attached to the Fresnel mirrors row 200 to rotate around their axis in tracking the sun's elevation angle. The rack 114 is perpendicular to the rotation axis of the mirrors 102. As shown in this particular implementation, each mirror row 200 has a single row pinion gear 402 that rotates responsive to linear movement of the STLS rack 114. In another implementation, there are two or more pinion gears 402 per row of mirrors 102—that is there are at least two-mirror rows 200 operating in the particular row of mirrors. Responsive to such linear movement, the STLS rack 114 rotates each mirror row 200 (200-1 through 200-N) to track the latitude motion of the sun. In this embodiment, one sliding rack 114 rotates, row-by-row, each and every one (i.e., all) the rows of mirrors 102. The sun's latitude motion adjustment of system 100 combined with a corresponding azimuth motion adjustment of the sun results in optimal concentration of the sun's rays on the heat exchanger 104. System 100 provides an excellent environment to heat cooler fluids introduced into heat exchanger 104 for heating and subsequent storage into hot fluids container 112.

Figure 5:
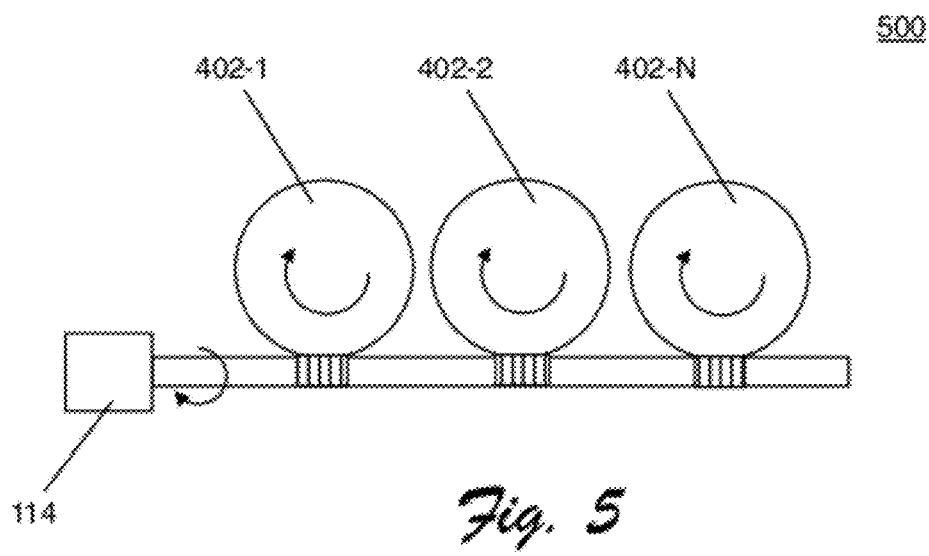
FIG. 5 shows mechanical aspects that facilitate the sun tracking latitude slider rack physically moving multiple rows of mirrors at one time, according to one embodiment.

FIG. 5 shows an exemplary mechanical pattern of the STLS rack 114 in contact with multiple pivot gears in respective mirror rows 200 in a solar heating system 100, according to one embodiment. As shown, a single STLS rack 114 interfaces with each pivot gear 402-1 through 402-N of multiple mirror rows 200 to angle/tilt multiple rows of mirrors at a same time.

Figure 6:
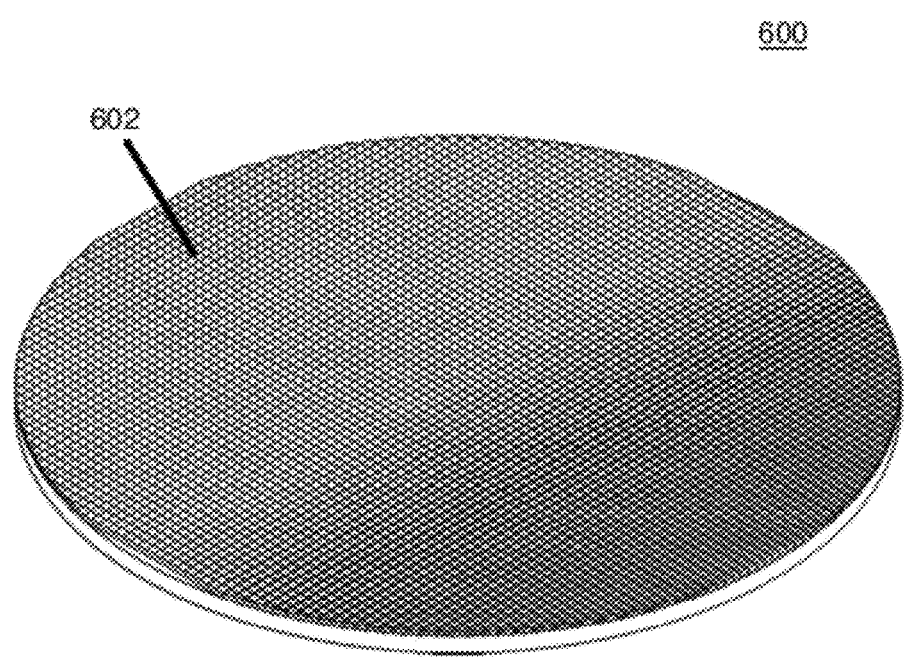
FIG. 6 illustrates a larger solar heater mirror array with many Fresnel mirrors attached, according to one embodiment.

FIG. 6 shows another exemplary mirror array configuration of a solar heater 600, according to one embodiment. In this implementation, the solar heater includes many more mirrors 602 than the mirrors 102 in the solar heater 100 of FIG. 1. In this implementation, multiple mirror rows 200 (FIG. 2) may be used to layout and configure the mirrors in each row of the mirrors. The mirror rows 200 will each be respectively configured to angle each mirror according to the angle of the mirror in the system with respect to the focal point on the heat exchanger and the latitude and longitude positions of the sun in the sky. Additionally, multiple STLS racks 114 in structural frame 504 can be used to align/concentrate the mirrors in each row of mirrors 200 (200-1 through 200-N) to respectively track the latitude motions of the sun.

Figure 7:
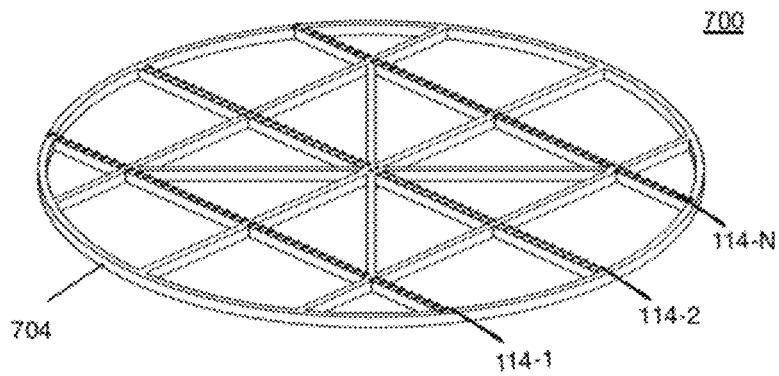
FIG. 7 illustrates another example of the structural foundation of a solar heating system that uses multiple sun tracking latitude-sliding racks to move respective rows of mirrors in its operations to track the latitude movement of the sun, according to one embodiment.

FIG. 7 shows an exemplary structural frame 704 with multiple STLS racks 114-1 through 114-N, according to one embodiment. In this implementation, the multiple STLS racks 114 are linearly moved by synchronized actuators (not shown) to latitudinal align respective mirrors in each row to concentrate their sun's rays onto a focal point of the heat exchanger (104). Azimuth alignment is also occurring as needed via central alignment control 302 (FIG. 3). In another embodiment, the multiple STLS racks 114 are simply connected together by crossbeams (not shown), which allow them to be moved by a single and same actuator.

Figure 8:
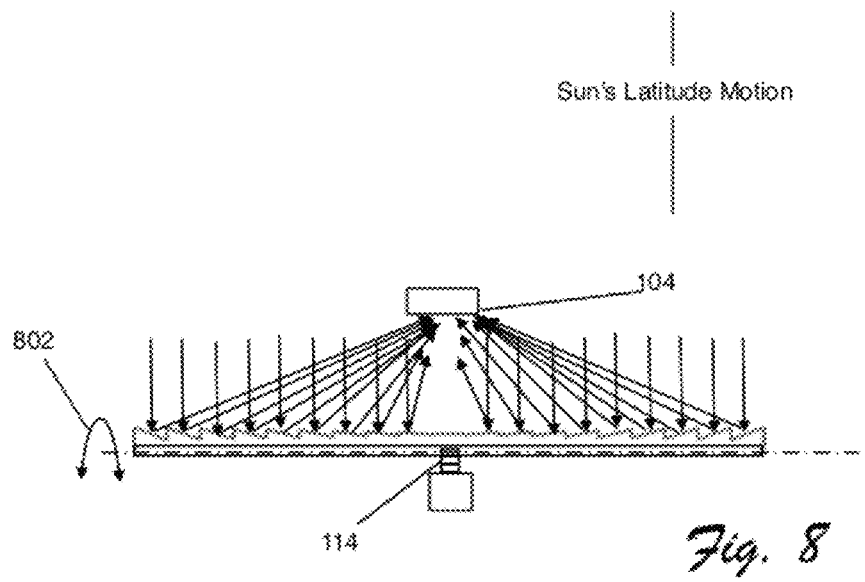
FIG. 8 shows an exemplary solar heating system with the sun directly overhead at ninety-degrees (90°), according to one embodiment.

FIG. 8 shows an exemplary solar heating system 100 with the sun directly overhead at ninety-degrees with zero latitude adjustment, according to one embodiment. Please note that solar latitude angular change is matched by rotation (mirror row rocking motion) by the Sun Tracking Latitude Sliding (STLS) rack 114 of each mirror in the row that equals half of the solar angular change. This is elaborated as shown by the angled arrow 802.

Figure 9:
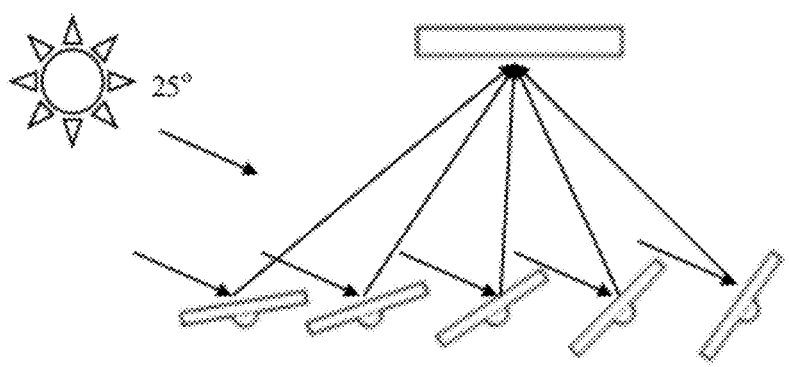
FIG. 9 shows an exemplary solar heating system with the sun laterally offset twenty-five degrees (25°), according to one embodiment.
Figure 10:
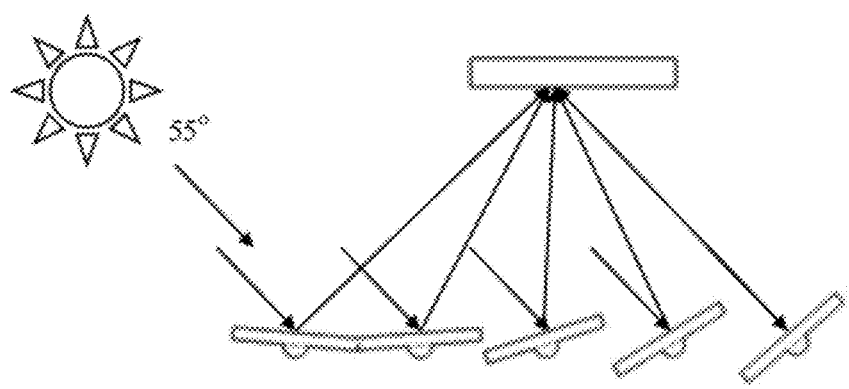
FIG. 10 shows an exemplary solar heating system with the sun laterally offset fifty-five degrees (55°), according to one embodiment.

FIG. 9 shows an exemplary solar heating system 100 with the sun laterally offset twenty-five degrees (25°), according to one embodiment. In addition to the azimuth adjustments made by central adjustment pivot 302 of FIG. 3, STSL rack 114 rotates ½ of the solar angular change to focus the row's mirrors on the concentration/focal point on the heat exchanger 104 (e.g., see FIGS. 3b and 3c). FIG. 10 shows an exemplary solar heating system 100 with the sun laterally offset fifty-five degrees) (55°, according to one embodiment. In addition to the azimuth adjustments made by central adjustment pivot 302, STSL rack 114 rotates ½ of the solar angular change to focus the rows mirrors on the concentration point on the heat exchanger 104.

Figure 11:
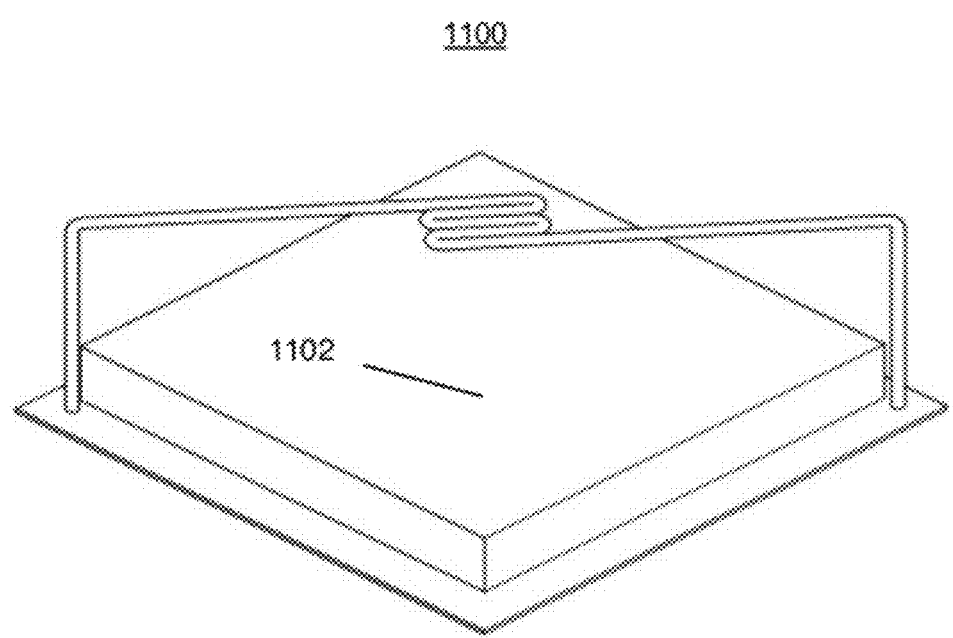
FIG. 11 shows an exemplary solar heating system covered by a clear transparent box, according to one embodiment.

FIG. 11 shows an exemplary solar heating system 100 or 600 covered by a clear transparent box 1102, according to one embodiment. The system can be covered with a transparent box (e.g. glass, plastic, etc.) to keep the dust from sticking to moving parts and to make cleaning the system very straightforward and simple.

An Exemplary Computing Device

Figure 12:
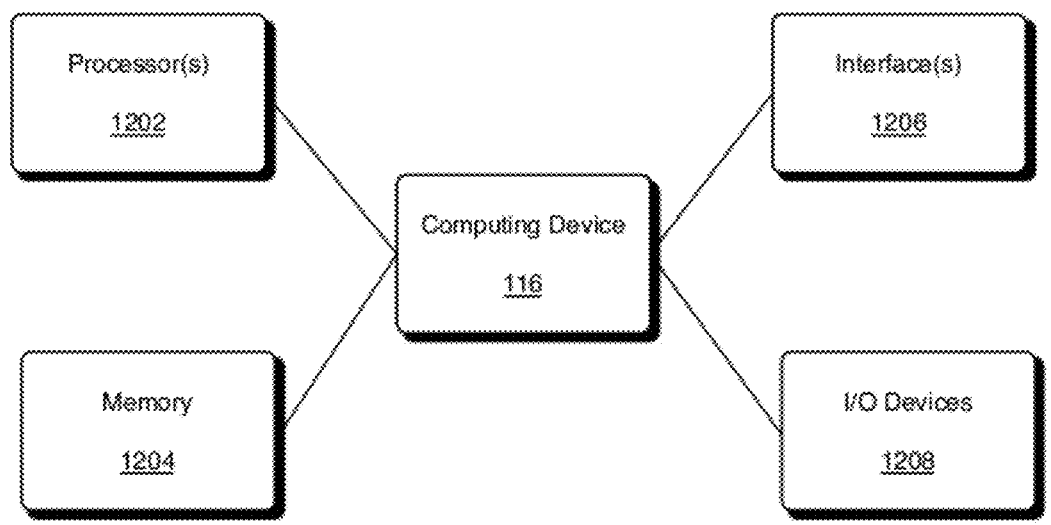
FIG. 12 shows an exemplary computing device to operate a solar heating system, according to one embodiment.

FIG. 12 shows an exemplary computing device to operate a solar heating system, according to one embodiment. In one embodiment, the solar heating systems described herein are operatively coupled to a computing device 116 (originally FIG. 1 and now described in detail in FIG. 12) or a data processing system to facilitate the described operations. The data processing system is a computing device that may be used to direct the various procedures described herein, for example, those associated with operations of systems and methods for solar heating. The computing device may be embedded and/or can function as a server, a client, a worker node, or any other computing entity. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In one implementation, computing device 116 includes one or more processor(s) 1202, one or more memory device(s) 1204, one or more interface(s) 1206, and one or more Input/output (I/O) device(s) 1208. In one implementation, the computing device is operatively coupled to a display device (not shown). Processor(s) 1202 include one or more processors or controllers that execute instructions stored in memory device(s) 1204 and/or mass storage device(s) (not shown) operatively coupled to the computing device. Processor(s) 1202 may also include various types of computer-readable media, such as cache memory.

Memory device(s) 1204 include various computer-readable media, such as volatile media (e.g., random access memory (RAM)) and/or nonvolatile memory (e.g., read-only memory (ROM)) and system memory comprising computer-program modules and program data. Computer-program modules include computer program instructions executable by the processor to perform and/or direct at least a subset of the operations described herein to operate aspects of system 100. Computer program modules and data may reside at various times in different storage components of the computing device and/or in components operatively coupled thereto, and are executed by processor(s) 1202. Memory device(s) 1204 may also include rewritable ROM, such as Flash memory. Mass storage device(s) include various computer readable media, such as magnetic tapes, magnetic disks, optical disks, solid-state memory (e.g., Flash memory), and so forth. Various drives may also be included in mass storage device(s) to enable reading from and/or writing to the various computer readable media. Mass storage device(s) include removable media and/or non-removable media.

Interface(s) 1206 include various interfaces that allow computing device 116 to interact with other systems, devices, or computing environments. Example interface(s) include any number of different network interfaces, such as interfaces to local area networks (LANs), wide area networks (WANs), wireless networks, and the Internet. Other interfaces include a user interface and peripheral device interfaces. I/O device(s) 1208 include various devices that allow data and/or other information to be input to or retrieved from computing device 116. Example I/O device(s) 1208 include cursor control devices, keyboards, keypads, microphones, voice-recognition, monitors or other display devices, speakers, printers, network interface cards, modems, lenses, and/or so on.

An Exemplary Procedure

Figure 13:
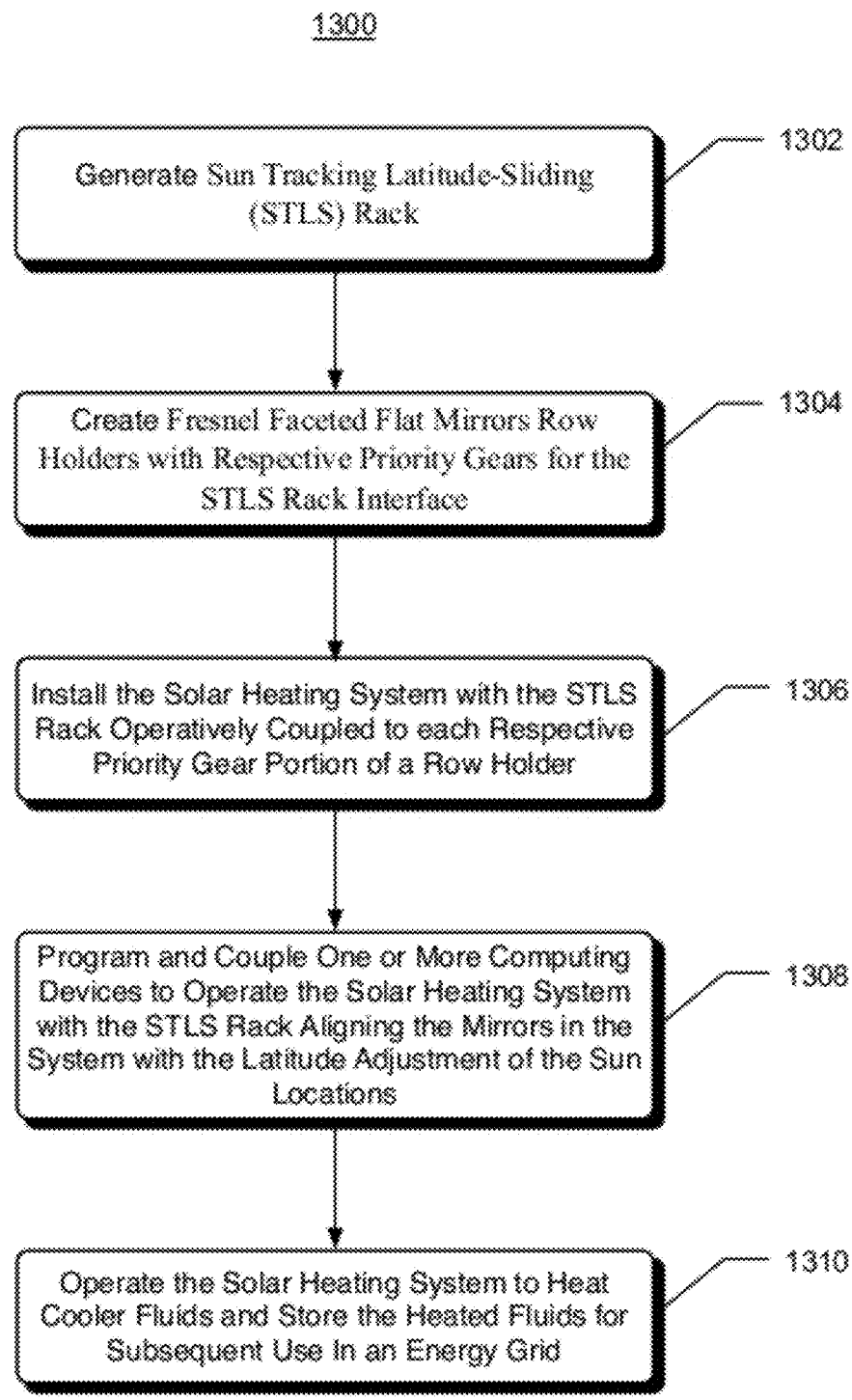
FIG. 13 illustrates an exemplary procedure to operate a solar heating device, according to one embodiment.

FIG. 13 is an exemplary procedure 1300 for a solar heating system, according to one embodiment. Operations of block 1302 generate as many Sun Latitude Translation Sliding (SLTS) racks (114) as needed to operate the solar heating system (e.g., 100 or 600). For example, the solar systems described above use one or more SLTS racks 114 to align respective rows of mirrors to track latitude changes of the sun over time. Regarding materials to makes the STLS rack(s) 114 each sliding rack 114 is made from rigid material that does not substantially elongate under load. This STLS rack 114 is designed for aligning angles of multiple mirrors associate with each mirror row (e.g., 200-1 through 200-N) via respective pivot gearings (402) that are designed to mesh with the sprockets/teeth of the STLS rack.

Operations of block 1304 create Fresnel faceted flat mirrors row holders 200 (200-1 through 200-N, e.g. please see FIG. 2) for each row of the solar heating system. Each of these row holders 200 takes into account its location within the solar heating system (e.g., systems 100 and/or 600) for each mirror that will be located/fixed to the row to allow that mirror to concentrate its received sun rays onto a focal point on the particular system's heat exchanger. Operations of block 1306 install the solar heating system with the SLTS rack(s) 114 operatively couple to the pinion gears (e.g., gears 402-1 through 402-N) of each row holder 200-1 through 200-N. Operations of block 1308 program and couple one or more computing devices 116 to the solar heating system. The computing device(s) are operatively programmed to direct the RTLS rack(s) 114 to automatically latitudinal align the row holders 200-1 through 200-N on the system to track the latitude motion of the sun throughout the energy collection sessions. Operations of block 1310 operate the solar heating system to heat cooler fluids and use the resulting heated fluids to provide additional energy, for example, to an energy grid—e.g. to desalinate water, to provide electricity to energy user(s), etc.

Alternate Embodiments

Although solar heating systems and methods have been described in language specific to structural features and/or methodological operations or actions, it is understood that the implementations defined in the appended claims are not necessarily limited to the specific features or actions described. For example, this described system has high utilization of solar energy per unit area (comparable to parabolic dish), while structurally simpler and much less cost. Also, shading to neighboring systems is very minimal. Also, for example, the described STLS rack(s) 114 (e.g., of FIG. 1 and other Figures) and the corresponding pinion gears 402 (FIG. 4) are mechanical and employed to collectively rotate the mirrors 102 to track the elevation angle of the sun. However, there are other means to do this job. In one embodiment, pinion gear 402 is replaced with a wheel that has magnets, and the sliding rack is replaced by an electromagnetic linear motor to rotate the pivot wheel 402. In this example, the collective rotation of the mirrors is achieved to track the sun's elevation.

Figure 14:
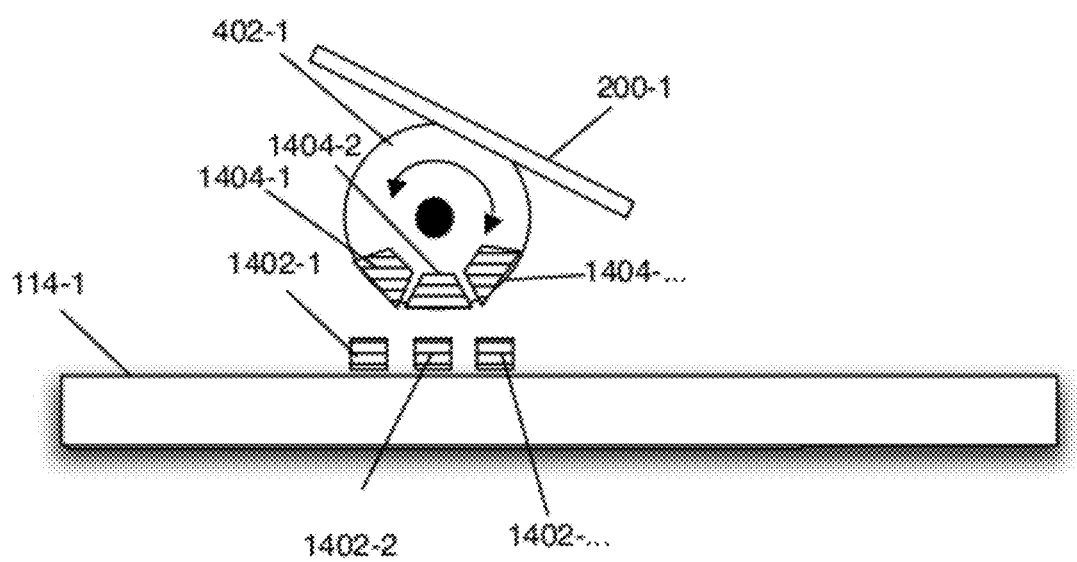
FIG. 14 shows an exemplary sliding rack that is an electromagnetic linear motor to control rotation of a pinion device operatively coupled to a specific Fresnel mirror row, according to one embodiment.

FIG. 14 shows an exemplary sliding rack 114-1 that implements an electromagnetic linear motor to control rotation of pinion device 402-1 operatively coupled to a specific Fresnel mirror row 200-1, according to one embodiment. In this diagram the components sliding rack 114-1, mirror row 200-1 and pinion device 402-1 are numbered to represent that there may be more than a single sliding rack 114, and that there are pluralities of pinion devices 402, each pinion device respectively being associated with a particular one of the plurality of mirror rows 200. In this example, sliding rack 114-1 includes multiple electromagnetic coils 1402 (e.g., 1402-1 through 1402-N) that are switched on and off. The electromagnetic coils 1402 are shown with only with three (3) electromagnetic coils (1402-1 through 1402-N) for matters of efficiency and space. Similarly, pinion device/wheel 402-1 is surrounded on its diameter by magnets 1404-1 through 1404-N. For the same reasons as electromagnetic coils 1402, magnets 1404-1 through 1404-N are shown as three (3) magnets. In this implementation, the collective rotation of the mirrors is achieved to track the sun's elevation by the sliding rack turning its electromagnetic coils on and off to control rotating motion of the pinion device. Please note that the order of installation of the magnets and the electromagnetic device(s) can be reversed. For example, the slider rack(s) 114 can be magnetic and the pinion devices 402 can be electromagnetic, or they can both be electromagnetic.

Accordingly, the specific features and operations of the described solar heating systems and methods are disclosed as exemplary forms of implementing the claimed subject matter.

The invention claimed is:

1. A solar heating system comprising:
   multiple mirror row holders, the mirror row holders having a fresnel-shaped cross-section, each mirror row holder of the mirror row holders hold a row of mirrors at fixed respective angles to adjacent mirrors to track sun rays, each mirror row holder having a single pinion device of multiple pinion devices associated with the multiple mirror row holders, the singular pinion of each mirror row holder being located at the middle of each mirror row holder; the solar heating system being operatively coupled to a substantially circular base;
   a sun tracking latitudinal slider (STLS) rack operatively configured to interface with each pinion device of multiple pinion devices simultaneously, the STLS rack being comprised of a threaded rod, the interface automatically tilting the mirrors in each mirror row holder through the rotation of the STLS rack, said rotation causing each mirror row holder to tilt a latitude amount to adjust mirror angles to reflect latitudinal sun motion during daylight and to concentrate rays of the sun onto the focal point;
   a heat exchanger including a focal point, the heat exchanger being operatively coupled to a fluid input portion and a heated fluid output portion;
   an azimuth adjustment mechanism to control mirror angles with respect to the sun to reflect sun motion during daylight and to concentrate rays of the sun onto the focal point; and,
   a controller configured to:
      simultaneously adjust the angles of the mirrors using the STLS rack to track the latitude motion of the sun and concentrate sun ray reflections onto the focal point; and
      simultaneously use the azimuth adjustment mechanism to adjust mirror angles to track azimuth motion of the sun and concentrate sunray reflections onto the focal point.

2. The solar heating system of claim 1, wherein each pinion device is a gear and wherein the STLS rack is made to interface with the pinion gears.

3. The solar heating system of claim 1, wherein each pinion device is a wheel with magnets on its diameter and wherein the STLS rack is an electromagnetic device made to move the pinion magnets.

4. The solar heating system of claim 1, wherein the STLS rack is made with magnets on its length, and wherein each pinion device is an electromagnetic wheel that responds to magnets sliding in proximity on the STLS rack.

5. The solar heating system of claim 1, wherein each pinion device is a wheel with magnets and wherein the STLS rack is an electromagnetics linear motor that interfaces with the pinion devices.

6. A solar heating system comprising:
   multiple mirror row holders, the mirror row holders having a Fresnel-shaped cross-section, each mirror row holder of the mirror row holders hold less than a row of mirrors at fixed respective angles to adjacent mirrors to track sun rays and reflect the tracked rays onto a focal point, each mirror row holder having a single pinion device of multiple pinion devices associated with the multiple mirror row holders, the singular pinion of each mirror row holder being located at the middle of each mirror row holder; the solar heating system being operatively coupled to a substantially circular base;
   multiple sun tracking latitudinal slider (STLS) racks operatively configured to interface with each pinion device of multiple pinion devices simultaneously, the STLS rack being comprised of a threaded rod, the interface automatically tilting the mirrors in each mirror row holder through the rotation of the STLS rack, said rotation causing each mirror row holder to tilt a latitude amount to adjust mirror angles to reflect latitudinal sun motion during daylight and to concentrate rays of the sun onto the focal point;

a heat exchanger including the focal point, the heat exchanger being operatively coupled to a fluid input portion and a heated fluid output portion; and an azimuth adjustment mechanism to control mirror angles with respect to the sun to reflect sun motion during daylight and to concentrate rays of the sun onto the focal point a controller configured to:

simultaneously adjust the angles of the mirrors using the STLS racks to track the latitude motion of the sun and concentrate sun ray reflections onto the focal point; and simultaneously use the azimuth adjustment mechanism to adjust mirror angles to track azimuth motion of the sun and concentrate sun ray reflections onto the focal point.

7. The solar heating system of claim 6, wherein each pinion device is a gear and wherein the STLS rack is made to interface with the pinion gears.

8. The solar heating system of claim 6, wherein each pinion device is wheel with magnets on its diameter and wherein the STLS rack is an electromagnetic device made to move the pinion magnets.

9. The solar heating system of claim 6, wherein the STLS rack is made with magnets on its length, and wherein each pinion device is an electromagnetic wheel that responds to magnets sliding in proximity on the STLS rack.

10. The solar heating system of claim 6, wherein each pinion device is a wheel with magnets and wherein the STLS rack is an electromagnetics linear motor that interfaces with the pinion devices.

* * * * *